(12) United States Patent
Fatourechi et al.

(10) Patent No.: US 11,531,692 B2
(45) Date of Patent: *Dec. 20, 2022

(54) TITLE RATING AND IMPROVEMENT PROCESS AND SYSTEM

(71) Applicant: BroadbandTV, Corp., Vancouver (CA)

(72) Inventors: Mehrdad Fatourechi, Vancouver (CA); Lino E. Coria Mendoza, Vancouver (CA); Shahrzad Rafati, Vancouver (CA)

(73) Assignee: BroadbandTV Corp., Vancouver (CA)

( * ) Notice: Subject to any disclaimer, the term of this patent is extended or adjusted under 35 U.S.C. 154(b) by 596 days.

This patent is subject to a terminal disclaimer.

(21) Appl. No.: 16/206,543

(22) Filed: Nov. 30, 2018

(65) Prior Publication Data

US 2019/0108183 A1 Apr. 11, 2019

Related U.S. Application Data

(63) Continuation of application No. 14/579,145, filed on Dec. 22, 2014, now Pat. No. 10,176,256.

(60) Provisional application No. 61/919,967, filed on Dec. 23, 2013.

(51) Int. Cl.
*G06F 16/332* (2019.01)
*G06F 16/78* (2019.01)

(52) U.S. Cl.
CPC ...... *G06F 16/3325* (2019.01); *G06F 16/7867* (2019.01)

(58) Field of Classification Search
CPC .... G06F 16/3325; G06F 16/332; G06F 16/33; G06F 16/30; G06F 16/7867; G06F 16/787

See application file for complete search history.

(56) References Cited

U.S. PATENT DOCUMENTS

| | | | |
|---|---|---|---|
| 5,418,951 A | 5/1995 | Damashek | |
| 7,925,498 B1 | 4/2011 | Baker et al. | |
| 8,126,936 B1* | 2/2012 | Giblin | G06Q 40/12 707/804 |
| 8,145,648 B2* | 3/2012 | Kunjithapatham | G06F 16/70 707/749 |
| 8,209,316 B2 | 6/2012 | Li et al. | |
| 8,316,019 B1 | 11/2012 | Ainslie et al. | |
| 8,321,201 B1* | 11/2012 | Baker | G06F 16/3338 704/9 |
| 8,364,671 B1* | 1/2013 | Sinton | G06F 16/951 707/728 |
| 8,396,286 B1 | 3/2013 | Aradhye et al. | |
| 8,407,216 B2* | 3/2013 | Walker | G06F 16/48 707/731 |
| 8,433,698 B2 | 4/2013 | Franks et al. | |
| 8,452,748 B1* | 5/2013 | Pugh | G06Q 10/101 707/706 |
| 8,594,998 B2 | 11/2013 | Litvak et al. | |
| 8,682,907 B1* | 3/2014 | Yang | G06F 16/3334 707/750 |

(Continued)

*Primary Examiner* — Miranda Le
(74) *Attorney, Agent, or Firm* — Holzer Patel Drennan

(57) ABSTRACT

In accordance with one embodiment, a method can be implemented that comprises receiving as an input a title of a video from a video sharing web site; parsing the title of the video into one or more n-grams; computing with a computer a title-searchability-score by utilizing the one or more n-grams.

15 Claims, 9 Drawing Sheets

(56) References Cited

U.S. PATENT DOCUMENTS

| | | | |
|---|---|---|---|
| 8,892,549 B1 | 11/2014 | Thakur | |
| 8,903,798 B2 * | 12/2014 | El-Saban | H04L 67/02 |
| | | | 707/708 |
| 8,938,438 B2 | 1/2015 | Nijjer | |
| 9,020,924 B2 | 4/2015 | Wu et al. | |
| 9,026,540 B1 * | 5/2015 | Postelnicu | G06F 16/21 |
| | | | 707/748 |
| 9,087,297 B1 | 7/2015 | Filippova et al. | |
| 9,165,069 B2 | 10/2015 | Tseng | |
| 9,171,078 B2 | 10/2015 | Imig et al. | |
| 9,189,525 B2 * | 11/2015 | Acharya | G06F 16/739 |
| 9,454,530 B2 | 9/2016 | Sabah et al. | |
| 9,645,987 B2 * | 5/2017 | Ramanathan | G06F 16/48 |
| 10,194,212 B2 * | 1/2019 | Lentzitzky | H04N 21/6125 |
| 2007/0038615 A1 | 2/2007 | Vadon et al. | |
| 2008/0243481 A1 | 10/2008 | Brants et al. | |
| 2009/0113475 A1 | 4/2009 | Li | |
| 2009/0327236 A1 | 12/2009 | Denney et al. | |
| 2012/0010874 A1 * | 1/2012 | Shin | H04N 21/4828 |
| | | | 704/9 |
| 2012/0041768 A1 | 2/2012 | Reese | |
| 2013/0254209 A1 | 9/2013 | Kang | |
| 2014/0365453 A1 | 12/2014 | Alonso Lago | |
| 2017/0323016 A1 * | 11/2017 | Feng | G06F 16/7867 |

* cited by examiner

TITLE RATING AND IMPROVEMENT PROCESS AND SYSTEM

CROSS-REFERENCE TO RELATED APPLICATIONS

The present application claims the benefit of priority U.S. patent application Ser. No. 14/579,145 entitled "Title Rating and Improvement Process and System" and filed on Dec. 22, 2014 and of U.S. Provisional Patent Application No. 61/919,967, entitled "Title Rating and Improvement Process and System" and filed on Dec. 23, 2013, which are hereby incorporated by reference in their entireties and for all purposes.

BACKGROUND

Digital media sharing websites such as YouTube™ facilitate user searches for digital content and make a large amount of content available to the public. When a user performs a keyword search for digital content, the search results often include a series of titles and occasionally thumbnail images representative of the content. High-traffic digital media websites maintain user-searchable indices and may add tens of thousands of media files every day. Of these, some titles are more suitable and searchable than others.

SUMMARY

Embodiments described herein may be utilized to provide systems and methods for rating the quality of a video title and to provide some recommendations to improve the title. In one embodiment, a numeric score is computed for a title based on the important search terms included in the title. In another embodiment, a list of relevant and popular search terms is presented so that one or more of these terms can be added to the title in order to increase the score.

In accordance with one embodiment, a method can be implemented that comprises receiving as an input a title of a video from a video sharing web site; parsing the title of the video into one or more n-grams; and computing with a computer a title-searchability-score by utilizing the one or more n-grams.

In accordance with another embodiment, an apparatus can be implemented that comprises a user interface to receive as an input a title of a video from a video sharing web site; a parser to parse the title of the video into one or more n-grams; and a processor to compute a title-searchability-score by utilizing the one or more n-grams.

Further embodiments are apparent from the description below.

BRIEF DESCRIPTION OF THE DRAWINGS

A further understanding of the nature and advantages of the present technology may be appreciated by reference to the figures, which are described in the remaining portion of the specification.

DETAILED DESCRIPTION

Online media content providers of high-traffic digital content-sharing websites such as YouTube™, Flickr™ and SlideShare™ rely heavily on metadata to match their content with a user's search queries. If the metadata provide a good description of the media content then the user will likely be pleased with the search results and access the content. Examples of digital content include but are not limited to videos, images, audio, texts, or a combination of these media. Examples of metadata include titles, text describing the content, and related tags/keywords. Most of the media-sharing websites leave the process of entering metadata to the content creator. This can result in poorly constructed metadata that lacks useful information, as most content creators are not familiar with search engine optimization (SEO) techniques.

Titles are particularly useful as they are usually the first and sometimes the only textual information provided to the user about the media content. A well-written title with plenty of relevant information about the content can result in more clicks, more watch-time (or listen-time) and, if the content is monetized, more revenue for the owner of the content. Therefore, in accordance with one embodiment, a tool is described herein that may be utilized that rates the quality of a title from an SEO perspective and generates a list of recommendations on how to improve the title.

A title rating and improvement tool can intelligently rate a title and offer suggestions for improving the title by computing a quality score obtained after ranking the words and phrases in the title according to the impact they have on search. In one embodiment, a set of new phrases is suggested in order to increase the probability of the title being found by user queries. In another embodiment, an alternative title is provided.

Some of the new search engines concentrate on whole queries rather than individual words and, as a result, long-tail keywords, which are normally added to high-quality metadata, may generate more traffic for digital content. Long-tail keywords are strings of keywords that are very specific and, for this reason, they generally have low search volumes. However, videos that employ these types of keywords in their metadata have better chances of being ranked higher during searches. For titles, phrases are preferred to single words that are unconnected to the rest of the sentence.

Figure 1:
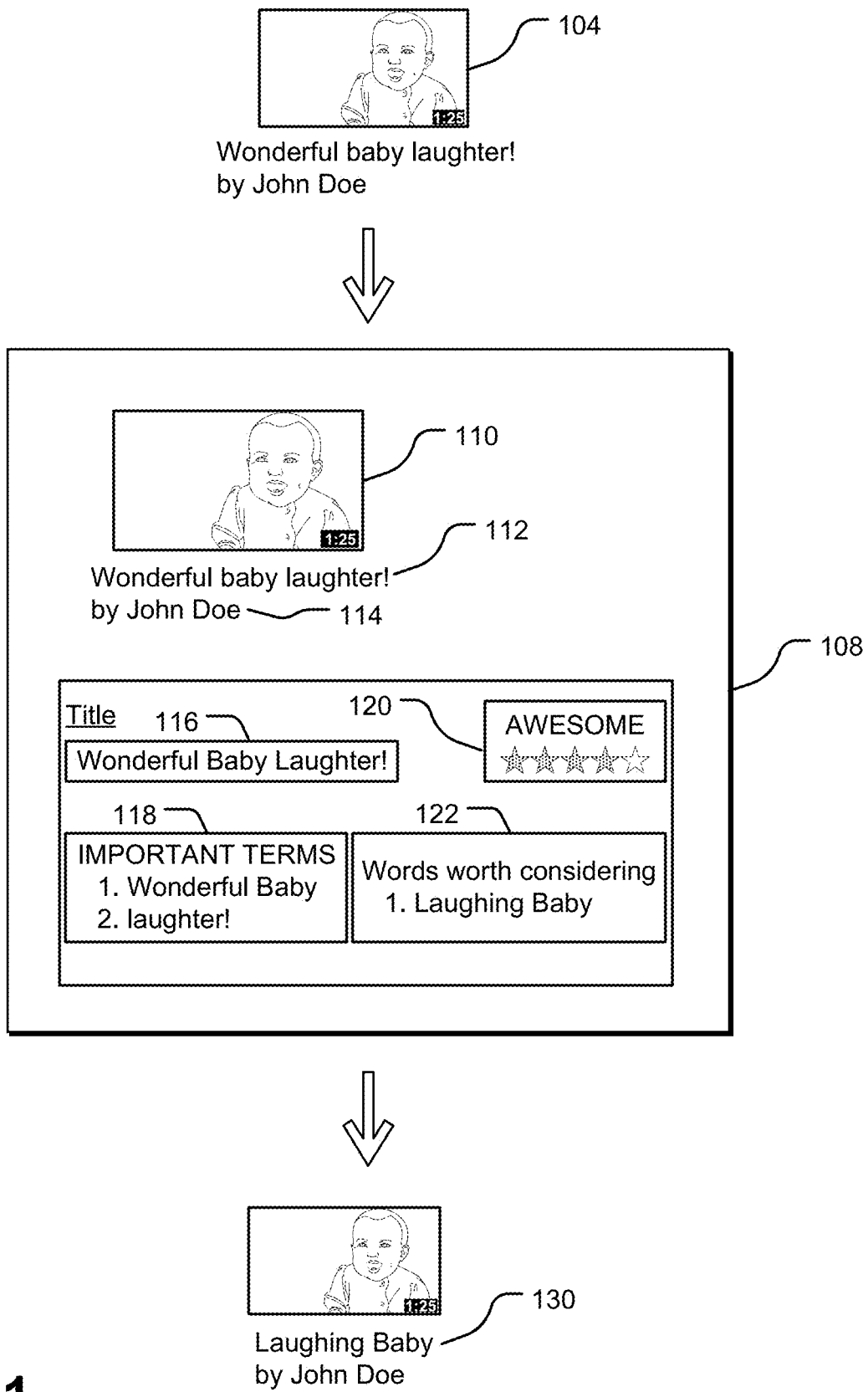
FIG. 1 illustrates an example of a title rating and improvement system in accordance with one embodiment.

FIG. 1 illustrates an example of an embodiment for rating a title of user content and suggesting additional words or phrases for the title. In FIG. 1, an original piece of content 104 is provided. For example, it can be provided by someone uploading their video to a file sharing service. The title in this example is "Wonderful baby laughter!" The author is John Doe and the video has a run length of 1:25. A thumbnail image of the video is provided to convey further information about the content. In this case, an image from the video of a baby laughing.

FIG. 1 shows that a user interface 108 can then be used to display various reports about the user content. For example, in FIG. 1, the original content of the thumbnail image 110, original title 112, and author 114 are displayed. A title rating and improvement tool may then be used to determine important terms 118 from the title. In this example, the title rating and improvement tool has identified "Wonderful Baby" and "laughter!" as important terms. The title rating and improvement tool provides a rating for the original title. In this example, a word based rating is used and the title is rated as 4 out of 5 stars.

FIG. 1 also shows that there can be other words worth considering for the title. These are shown in block 122. In this example, the title rating and improvement tool proposes the term "Laughing Baby". The user may then alter the original title to create a revised title. FIG. 1 shows that the user has selected "Laughing Baby" as the revised title. In accordance with other embodiments, the change in the title could be implemented automatically. Thus, if the title rating and improvement tool suggests a different title, that different title can be implemented automatically in providing the content on a network such as the Internet.

In one embodiment, a numeric score, e.g., a number between 0 and 100, will inform the content creator on how searchable the content's title is. Alternatively, in another embodiment, instead or in addition to the numeric score, the creator may receive a brief written assessment of the title's quality or some other type of rating such as the use of stars (e.g., 0 to 5 stars).

In accordance with one embodiment, the main search terms available in the title are listed. This allows the user to understand which phrases and words from the title are more important (e.g., which phrases and words are the most relevant from an SEO point of view). Usually, there will be about 2 to 5 search terms. However, providing more search terms for long titles is possible. Furthermore, if the title is poorly written there might not be any search terms at all. In one embodiment, a list of keywords that are relevant to the content but have not been included in the title can also be added. Again, a title with a low score might not get any suggestions. In another embodiment, the content creator is offered a list of terms that could be used to replace some of the current words in the title. For instance, a word with the correct spelling (or the most popular spelling) might be suggested to the user. Sometimes no suggestion is available. Finally, in one embodiment a list of possibly related topics might be generated. This list includes other search terms that are indirectly related to the content. Users might use some of these words when searching for similar content.

Figure 2:
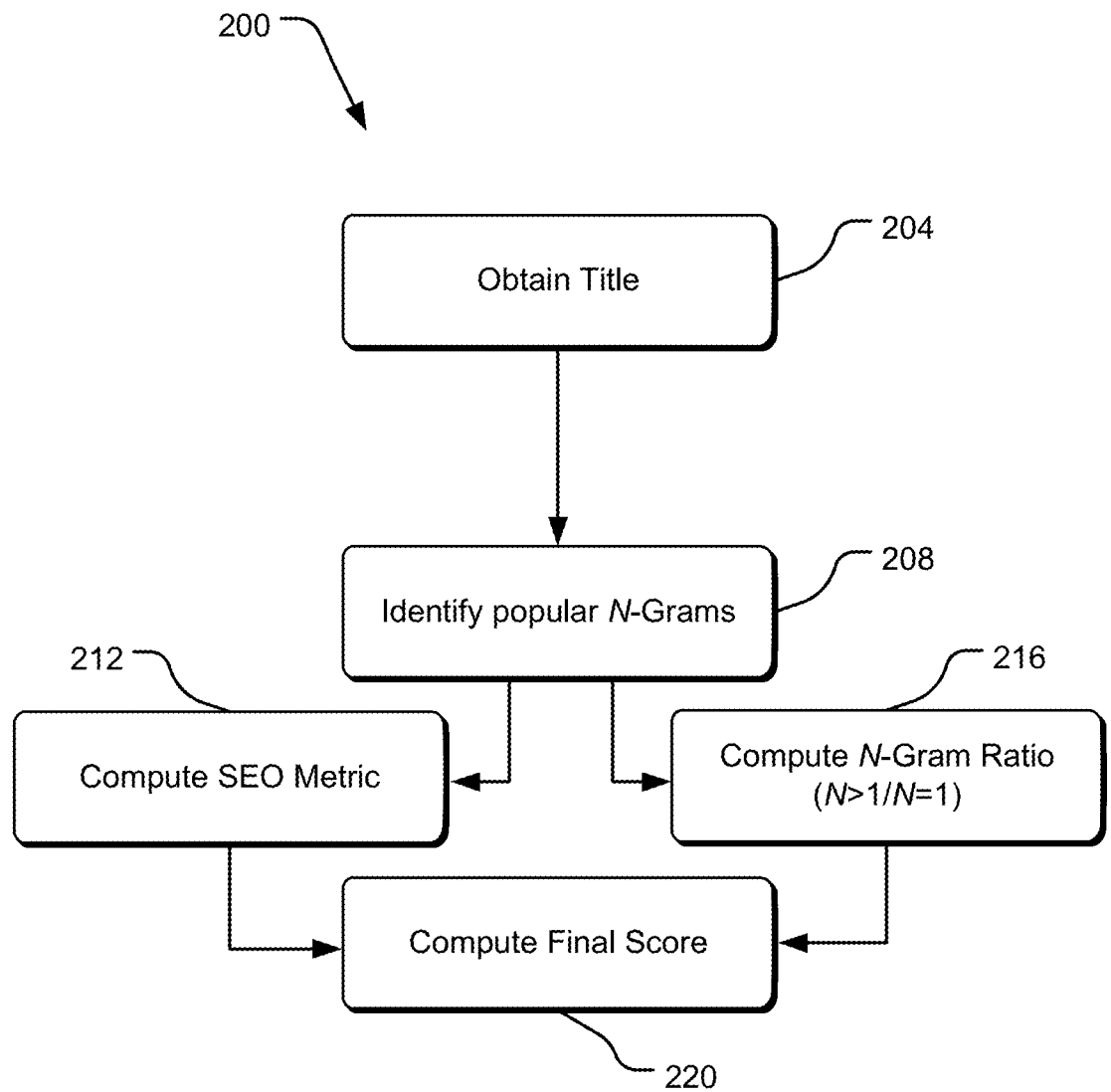
FIG. 2 is a flow chart illustrating a method of rating a title of a piece of content in accordance with one embodiment.

FIG. 2 illustrates one implementation of a title rating method in accordance with flowchart 200. In operation 204, a title is obtained for use as an input to the process. In operation 208, popular n-grams are identified. This can be accomplished by first identifying all the possible n-grams. An n-gram is defined as a contiguous sequence of n words taken from the title.

In operation 212, a search engine optimization (SEO) metric can then be computed. This metric indicates what portion of the title is useful for SEO purposes. And, in operation 216, an n-gram ratio is also computed. This parameter compares the number of n-grams for n>1 against the number of 1-grams. Both the SEO metric and the n-gram ratio are then used to compute a final score for the title, as shown by operation 220.

In one embodiment, the user directly enters the title of the media file through the interface provided. In another embodiment, the title of the media file is automatically retrieved from the digital media-sharing website.

In one embodiment, the language of the title is identified (e.g. English, Spanish, French, etc.). This information can be entered by the content creator or obtained from the digital media-sharing service. Alternatively, a language detection algorithm can be employed to identify the title's language. Although we will focus on titles written in English for the rest of this document, the same ideas and methods can be applied to a title in any language.

In another embodiment, two or more languages are chosen for each title. Titles written in more than one language are not uncommon. For instance, many videos in a language other than English combine the original language with English in the same title. This is particularly common in videos related to movies and video games (the following title, for instance, combines English and Spanish: "Elise Jungla, una de las más fuertes—League of Legends LoL—Gameplay en Español").

In one embodiment, the title is first divided into sentences and then n-grams are extracted from each sentence. As an example, if a sentence has three words in total, one 3-gram, two 2-grams, and three 1-grams can be obtained from it. For each sentence, n-grams that are popular search topics are identified. We first test the largest n-gram and proceed in descending order. For n-grams of the same size the order is not important. In one embodiment, an n-gram is considered to be a popular search topic if it is contained in an off-line database with desirable topics. In another embodiment, an n-gram is considered to be a popular search topic if there is an entry for the exact sequence of words in a local base or on the cloud or in an online knowledge base such as Wikipedia or Freebase. In another embodiment, the "search volume" of each n-gram is obtained. This value, which might be the number of searches per month, is used as an indicator of the popularity of each n-gram. If the "search volume" of an n-gram is higher than a predefined threshold, then the n-gram is considered to be a popular search topic. In another embodiment, n-grams can be weighted by the value of their corresponding "search volume".

In one embodiment, special characters are removed for any n-gram that was determined to be unpopular and verify if, by doing this, the modified n-gram is recognized as a popular search term. Special characters include but are not limited to punctuation (quotation marks, apostrophes, interrogation marks, exclamation marks, commas, brackets, semicolons, hyphens, etc.), and general typography (inverted exclamation marks, inverted question marks, asterisks, backslashes, etc.). As an example, the n-gram "Albert Einstein?" is not a popular search term. However, the n-gram "Albert Einstein" (the same term without a question mark) is recognized as popular.

In another embodiment, grammatical contractions (shortened versions of the written and spoken forms of words) are identified and the title is modified so that it includes the longer version of these words. For example: "I'm happy" becomes "I am happy". Once we do this, we verify whether the new n-gram is a popular search term or not.

In this embodiment, every n-gram that is identified as a popular search term is stored in a list. All the shorter n-grams that are contained inside a popular n-gram are ignored. The search process for popular n-grams continues until one gets to 1-grams. In one embodiment, any 1-gram that is a "stop word" is ignored. A stop word is any term that is very common and, therefore, not very useful as a search term. The language of the title determines the list of stop words. Examples of stop words in the English language are as follows: the, is, at, which, on. A determination is made as to whether the remaining 1-grams are popular search terms. Any popular 1-gram is added to the list.

The following example illustrates how popular n-grams are identified in one embodiment. Assuming the title is "Where's my Water? Gameplay!", one first divides the title into two sentences: "Where's my Water?" and "Gameplay!". The n-grams for the first sentence are as follows: "Where's my Water?" (3-gram), "Where's my" (2-gram), "my Water?" (2-gram), "Where's" (1-gram), "my" (1-gram), and "Water?" (1-gram). We identify the longest n-gram: in this case, the 3-gram "Where's my Water?", which is the name of a popular video game and, therefore, identified by our method as a popular search term. Once this 3-gram is chosen as popular, the remaining n-grams of the first sentence ("Where's my", "my Water?", "Where's", "my", and "Water?") are ignored. In other words, it is not necessary to investigate if the remaining n-grams are important search terms. The second sentence consists of a single 1-gram, "Gameplay!", which is not an important search term. However, once the exclamation mark is removed, this 1-gram becomes an important search term. The final list for this example contains two n-grams: "Where's my Water?" and "Gameplay" (without the exclamation mark).

In one embodiment, a title and selected n-grams can be employed to compute an SEO metric (sometimes referred to herein as SM), which is an indicator of how much of the title is useful for search engine optimization (SEO) purposes. In another embodiment, one can first determine an SEO to Title Ratio (STR) by dividing the total number of characters available in the chosen n-grams by the total number of characters available in the title (including spaces and special characters).

$$STR = \frac{n\text{-gram characters}}{\text{title characters}}$$

As an example, consider the title "Disneyland Paris HD—Snow White". The total number of characters in this title is 32. The two popular n-grams are "Disneyland Paris" and "Snow White" and they have 16 and 10 characters, respectively (including spaces). For this title, $$STR = \frac{16+10}{32} = 0.8125$$

In another embodiment, space and special characters are removed during the calculation of STR.

In one embodiment, the SM equals the STR value. In yet another embodiment, SM is computed differently. First, a desired STR value, STRd, is defined. If the title's STR is equal or higher than STRd then SM is set to 1. For STR values lower than STRd, SM equals STR divided by STRd, which results in a value between 0 and 1. This is summarized in the following equation.

$$SM = \begin{cases} \frac{STR}{STRd} & \text{if } STR < STRd \\ 1 & \text{if } STR \geq STRd \end{cases}$$

It is highly unlikely for a title to obtain a STR of 1 since this would require that the entire title be included in the n-gram list. Usually, there are going to be some characters such as spaces and punctuation that will not be part of the n-grams. STRd exists as a way of acknowledging this. If, for instance, STRd is set to a value of 0.9, any title with an STR value of 0.9 or higher is considered to be excellent. For our example, SM equals STR (0.8125) divided by STRd (0.9), which approximately yields 0.9.

The n-gram ratio, nR, is computed separately. In one embodiment, it is obtained by dividing the number of popular n-grams for the case when n>1 by the number of popular 1-grams. A very small value may be added to the denominator in case there are no 1-grams available (thus avoiding a division by zero). The larger nR is, the better the title is because searchable phrases are preferred to isolated words. In one embodiment, a lower limit nRmin is set and, if nR is lower than nRmin, the value of nR is changed to nRmin.

$$nR = \frac{n\text{-grams for } n > 1}{1\text{-grams} + \varepsilon}$$

In one embodiment, a final title score can be calculated by combining SM and nR. And, in one embodiment, the final score for the content's title is obtained with the following equation:

Title Score=round(MaxScore·SM·nR)

Where MaxScore is the maximum score that can be allocated to a title. In one embodiment, MaxScore can be 100. If the title score is higher than MaxScore, the value of the title score is changed to MaxScore.

In one embodiment, a penalty is applied to very short titles. As an example, in one embodiment, if lmin is the lowest number of characters that a title can have before being penalized and l is the length of the title (l<lmin), then the score is modified as follows:

New Title Score=Original Title Score−α($l_{min}$−l)

The parameter α is a positive constant value, usually between 1 and 5. If the resulting title score is negative then the title score is set to 0.

In another embodiment, titles that exceed a certain length are penalized. Digital media-sharing websites usually have a limit for the maximum character length that a title can have. However, sometimes very long titles are truncated when they are displayed on the screen. Therefore, it is advisable to have a slightly shorter title that is not truncated and therefore is displayed properly. The penalty can be as simple as subtracting a constant value from the title score, multiplying for a value between 0 and 1, or using an equation similar to the one applied for penalizing short titles:

New Title Score=Original Title Score−α(l−$l_{max}$)

In this embodiment, lmax is the largest number of characters that a title can have before being penalized and l is the length of the title (l>lmax). The parameter α is, again, a positive constant value, usually between 1 and 5.

In one embodiment, written assessments are provided in addition to the numerical score. To the average content creator, written assessments might be more intuitive and therefore more useful than a number. Messages can be as simple as "Good" or "Bad". Alternatively, a longer list of messages can be created. Each message is connected to a score range (example: "Bad" is assigned to a score below 51, etc.). In another embodiment, the numerical score is substituted by some visual scoring system such as stars, which remind users of the way some websites summarize movie reviews (e.g., best score equals having five stars).

In one embodiment, a series of improvement insights are provided to the content owner (or other user desiring to improve the title) in addition to the title score. In one embodiment, the popular n-grams are listed to the user as main search terms. If the title is very poorly written and there are no popular n-grams in the title then the user is notified of this situation.

Sometimes digital media-sharing services generate their own metadata for internal purposes. In one embodiment, these metadata can be used to identify other useful improvement insights. Usually the available metadata is a series of topics. These topics are compared to the title and, if some of these topics are not included in the title then these topics are offered to the content creator as a list of relevant keywords that can be added to the title of the content. As an example, for the title "Too Spooky For Me—Halloween Song", the term "Children's song" is recommended. In another embodiment, one or more of the relevant keywords are added to the title. Terms are replaced if needed. For example, the new suggested title would replace "Song" with "Children's Song" and the final title would read as "Too Spooky For Me—Halloween Children's Song".

In one embodiment, each available topic is compared to the words in the title and, if similar (but not identical) words are found, the similar words are suggested as replacements for current words in the topic. Examples include alternate spellings (e.g. "centre" vs. "center") and misspellings. In another embodiment, the title is improved by replacing misspelled words with the correct terms. As an example, the title "J K Rowling—Harvard Commencement Speech" would be automatically replaced by the title "J. K. Rowling—Harvard Commencement Speech".

Additionally, in another embodiment, other text-based sources might be employed to identify useful keywords and phrases that can be added to the title to improve the title score. Sources include (but are not limited to) the following:

Collaborative knowledge bases such as Freebase (Google Inc.);

Encyclopedias: including but not limited to Wikipedia and Britannica;

Review websites: Examples include Rotten Tomatoes (RT) for movies and Giant Bomb for games;

Information from other videos, including but not limited to the title, description, and tags of videos in online and offline video sharing databases (such as YouTube™ and Vimeo™);

Blogs and news websites such as CNN, TechCrunch, and TSN;

Educational websites such as how-to websites and digital libraries;

Information collected from web services and other software that generate phrases and keywords from an input text. Examples may include Calais and Zemanta.

The title can be used to collect relevant documents from each of the selected data sources. In one embodiment in particular, for each source, N pages (entries) are queried (N is a design parameter, which might be set independently for each source). Textual information is then extracted from each page. Note that, depending on the data source, different types of textual information can be retrieved or extracted from the selected data source. For example, for Rotten Tomatoes, reviews of a movie or information about the cast of a movie can be used as the source of information. Once the raw data is extracted from some or all the sources, filtering may be applied before the text is input to phrase/keyword recommendation algorithms. To remove redundant or unimportant keywords, text obtained from each of the employed data sources can be processed by a number of filters. Examples of filters include but are not limited to the following:

Stop Words Filter: This filter is used to remove predetermined stop words such as "the", "am", "is", "are", "of", etc.;

Short Words Filter: This filter is used to discard words whose length is shorter than or equal to a specified length (e.g., 2 characters);

Lowercase Filter: This filter converts all the input characters to lowercase;

Dictionary Filter: This filter removes keywords that do not exist in a given dictionary (e.g., English dictionary, etc.) or in a set of different dictionaries;

Black-List Filter: This filter removes those phrases/keywords that exist in a black list provided either by the user or generated automatically by a specific algorithm;

Markup Tags Filter: This filter is used to remove potential markup language tags (e.g., HTML tags) when processing data collected from data sources whose outputs are provided in a structured format such as Wikipedia.

The above potential filters can be applied in any order or any combination. For example, the best candidate phrases/keywords can be identified and recommended to the user. There are several algorithms available to recommend these phrases/keywords.

In one embodiment, frequency-based recommenders can be used. These recommenders consider the frequency of each keyword in the recommendation process. Examples include the following:

Frequency Recommender: This recommender collects words from a given text and recommends phrases or keywords based on their frequency in the text (i.e., the number of times a word appears in the text);

TF-IDF (Term Frequency-Inverse Document Frequency) Recommender: This recommender collects candidate phrases and keywords from a given text and recommends them based on their TF-IDF score. TF-IDF is a numerical statistic that reflects how important a word is to a document in a collection or corpus. It is often used as a weighting factor in information retrieval and text mining. The TF-IDF value increases proportionally to the number of times a word appears in the document. However, it is offset by the frequency of the word in the corpus, which compensates for the fact that some words are more common than others.

In another embodiment, probabilistic-based recommenders can be utilized. These include but are not limited to:

Random Walk-based Recommender: This recommender collects candidate phrases from the specified data sources, builds a graph based on the co-occurrence of keywords or phrases in a given input text, and recommends phrases based on their ranking according to a random walk on the graph. The nodes in the created graph are the phrases that appear in the input test source, and there is an edge between every two phrases (nodes) that co-occur in the input text source. Also, the weight of each edge is set to the co-occurrence rate of the corresponding phrases;

Surprise-based Recommender: This recommender is designed to detect those phrases in a given text that may sound surprising or interesting to a reader. In this recommender, given an input text, a Bayesian learner is first created. The prior probability distribution of the Bayesian learner is estimated based on the background information of a hypothetical observer. For instance, the prior probability distribution can be set to a vague distribution such as a uniform distribution so that all phrases look "not surprising" or "not interesting" to the observer at first. When a new phrase comes in (e.g., when new data is observed), the Bayesian learner updates its prior belief (e.g., its prior probability distribution) based on Bayes' theorem so that the posterior information is obtained. The difference between the prior and posterior is then considered as the surprise value of the new phrase. This process is repeated for every phrase in the input text. At the end of the process, those phrases whose surprise value is above a specific threshold are recommended to the user;

Conditional Random Field (CRF)-based Recommender: This recommender suggests phrases or keywords by modeling the co-occurrence patterns and dependencies among various words (e.g., the dependency between "Tom" and "Cruise"). A relation between different text documents can also be modeled by this recommender. One key advantage of the CRF model is that it can be applied on several arbitrary non-independent features extracted from the input phrases. Hence, depending on the extracted feature vectors, different levels of performance can be achieved. In this recommender, the input feature vectors can be built based on the co-occurrence rate between each pair of keywords in the input text, the term frequency of each keyword within the given input text, the term frequency of each keyword across a set of similar text documents, etc. This recommender can be trained by different training data sets so as to estimate the CRF model's parameters. The trained CRF model in this recommender can then score different phrases or keywords in a given test text so that a set of top relevant phrases/keywords can be recommended to the user.

In another embodiment, a synergy-based or collaborative-based recommender can be utilized. This recommender analyzes the uploaded media file by some specific algorithms (e.g., video or audio fingerprinting methods) to find some similar content in some specific data sources (e.g., YouTube™), and uses the found content's title and tags in the recommendation process. In particular, the system can use the phrases and tags of those videos that are very popular (e.g., those videos in YouTube™ whose number of views are above a specific value).

In yet another embodiment, a search-volume-based recommender is used. This recommender uses phrases and keywords extracted from the terms used to search for a specific piece of content in a specific data source (e.g., YouTube™). In particular, the system can utilize those terms that have been searched a lot for retrieving a specific piece of content (e.g., those phrases or keywords whose search volume is above a certain amount).

In one embodiment, if the passive voice is identified in any sentence, the system turns the passive voice sentence into an active voice sentence. In active voice, the subject does the action designated by the verb. For example, the passive sentence "The children were helped by the firemen" is replaced with "The firemen helped the children". Choosing active sentences over passive sentences is useful as passive sentences often sound wordy and can make the reader work unnecessarily hard. Also, passive voice sentences are usually longer than active voice sentences.

In another embodiment, sentences with excessive punctuation will also be modified. It is not uncommon, for instance, to find titles for digital content that overuse exclamation marks. For example, the title "This is what I got for Christmas!!!" could be replaced with "This is what I got for Christmas!" since the extra exclamation marks do not improve the chances of the sentence being discovered organically.

Finally, in one embodiment, a list of possibly related keywords can be generated. This list includes other search terms that are indirectly related to the content. These keywords might be found by looking at the topics that are linked to the metadata in the knowledge base.

Figure 3:
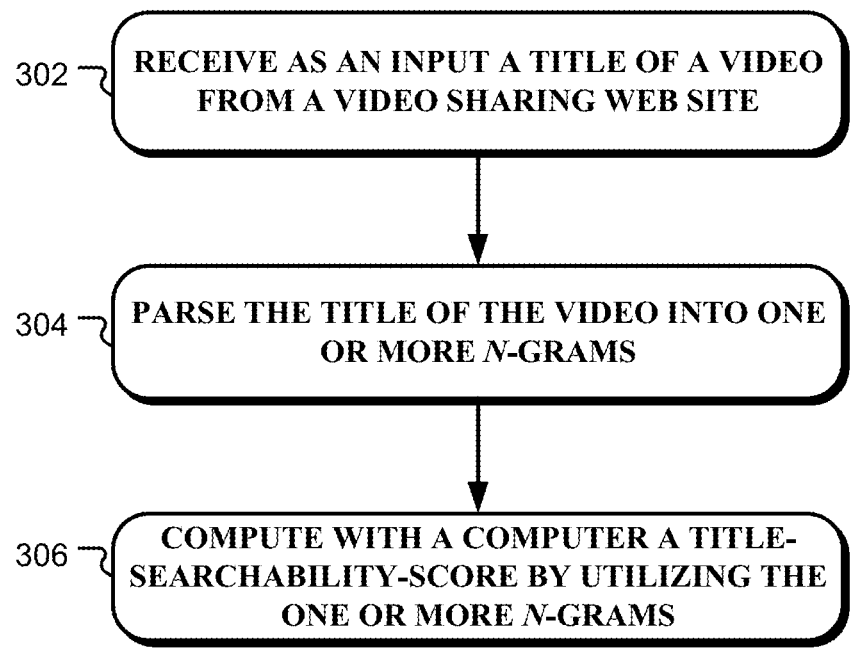
FIG. 3 is a flow chart illustrating a method of determining a title-searchability-score in accordance with one embodiment.

Various embodiments described herein can also be illustrated by the following flow charts and block diagrams. For example, FIG. 3 illustrates an embodiment for determining a score for a title. For purposes of clarity, the score is referred to as a title-searchability-score in that the score indicates the strength of a title when the content associated with the title is searched for. In operation 302, an input is received. The input is a title of a video from a video sharing web site, such as YouTube™. The title of the video is then parsed into one or more n-grams, as shown by operation 304. As noted earlier, an n-gram is a contiguous sequence of n words taken from the title. Operation 306 shows that a title-searchability-score can then be computed by utilizing one or more of the n-grams.

Figure 4:
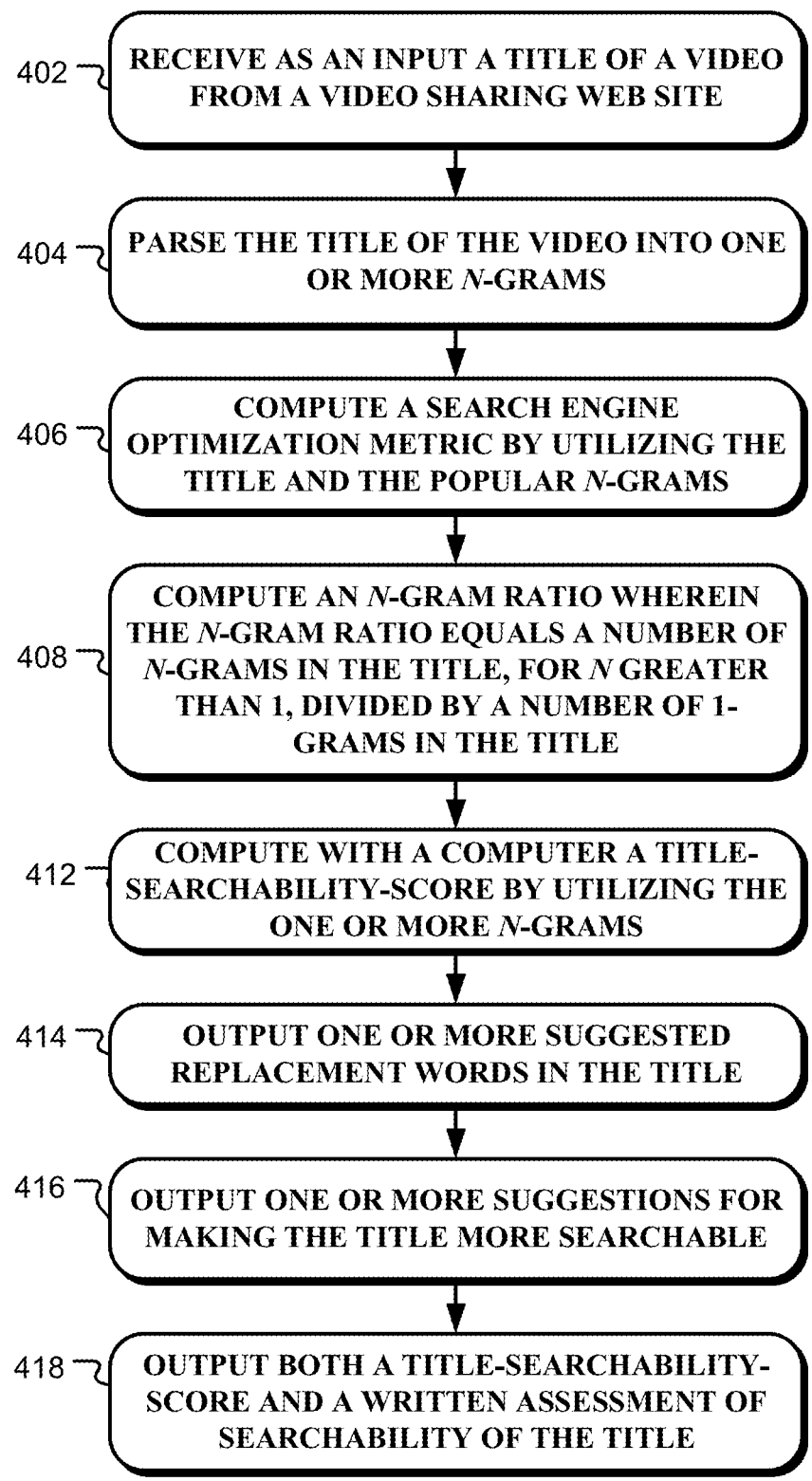
FIG. 4 is a flow chart illustrating a method of determining title characteristics in accordance with one embodiment.

FIG. 4 illustrates an embodiment for making a title easier to find via a search. In operation 402, a title of a video is received as an input. In operation 404, the title is parsed into one or more n-grams. In operation 406, a search engine optimization metric is computed. To compute the search engine optimization metric, the title and n-grams from the title that are determined to be popular can be utilized. Similarly, an n-gram ratio can be calculated. The n-gram ratio shown in FIG. 4 is the number of n-grams in the title (for n greater than 1) divided by the number of 1-grams in the title.

Operation 412 shows that a title-searchability-score can be computed with a computer, e.g., with a computer processor. As noted above, one manner of computing a title-searchability-score is via the equation: Title Score=round (MaxScore·SM·nR), wherein MaxScore is a number such as 100, SM is a search engine optimization metric, and nR is an n-gram ratio. Stated another way, the title-searchability-score in this example is the rounded version of MaxScore multiplied by SM multiplied by the n-gram ratio.

Figure 5:
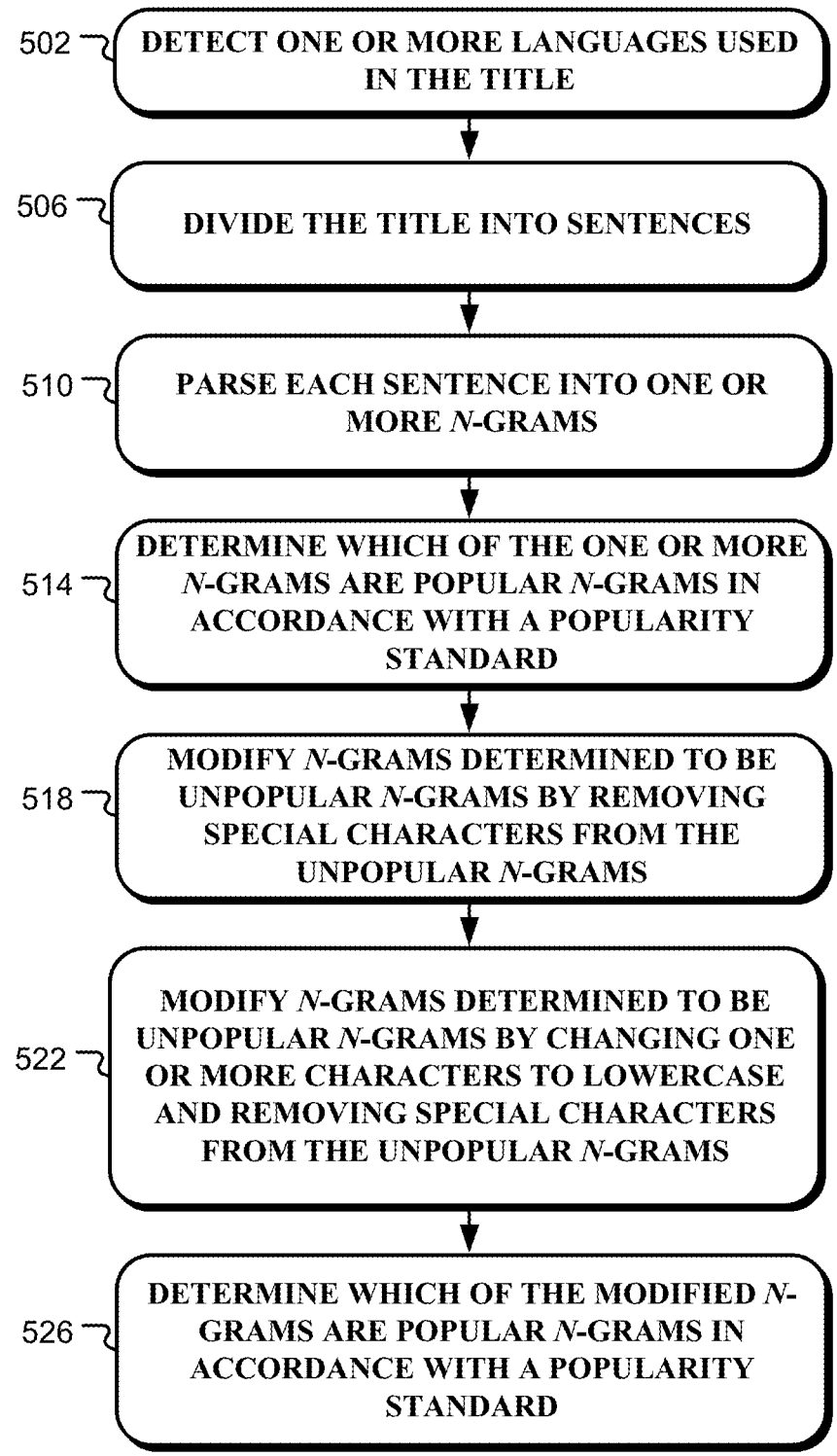
FIG. 5 is a flow chart illustrating a method of assessing n-grams and modified n-grams for popularity in accordance with one embodiment.

FIG. 5 illustrates an embodiment for determining popular n-grams from a title. A title is first received for analysis. In operation 502, a computer processor analyzes words from the title to determine in which language or languages the title is written. In operation, 506, the title is divided into sentences. Each sentence is parsed into one or more n-grams, as shown by operation 510. In operation 514, an initial determination is made as to which of the one or more n-grams are popular in accordance with a pre-determined popularity standard.

Some n-grams might be determined not to be popular in accordance with the popularity standard. As noted earlier, this can occur due to punctuation, capitalization, special characters, etc. being included in the n-gram. Therefore, a further analysis can be conducted on the unpopular n-grams. In operation 518, n-grams that were determined to be unpopular can be modified by removing special characters from the unpopular n-grams. In operation 522, n-grams that were determined to be unpopular can be modified by changing one or more characters in an n-gram to lowercase. Then, the modified n-grams can be assessed against the predetermined popularity standard to see if the modified n-grams are popular, as shown by operation 526. Ultimately, a list of popular n-grams can be compiled that originated from the title.

Figure 6:
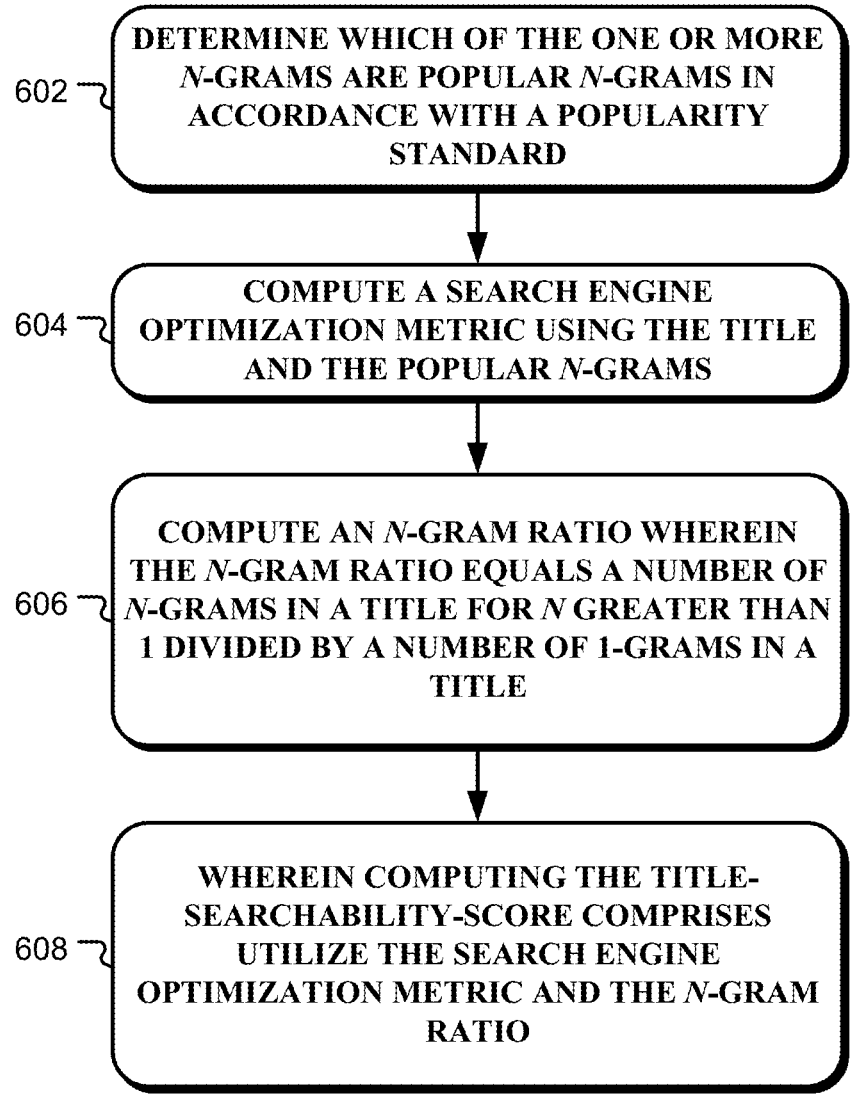
FIG. 6 is a flow chart illustrating a method of determining a title-searchability-score in accordance with one embodiment.

FIG. 6 illustrates an embodiment for computing a score for a title based on n-grams that have been determined to be popular. In operation 602, a computer determines which of the one or more n-grams in a title are popular n-grams. The popularity assessment can be done based on a predetermined popularity standard. In operation 604, the computer can compute a search engine optimization metric using the title and the popular n-grams. This can be performed as explained above. Furthermore, in operation 606, an n-gram ratio can be computed. For example, the n-gram ratio can equal the number of n-grams in the title (for n greater than 1) divided by the number of 1-grams in the title. In operation 608, the title-searchability-score can then be computed using at least the search engine optimization metric and the n-gram ratio.

Figure 7:
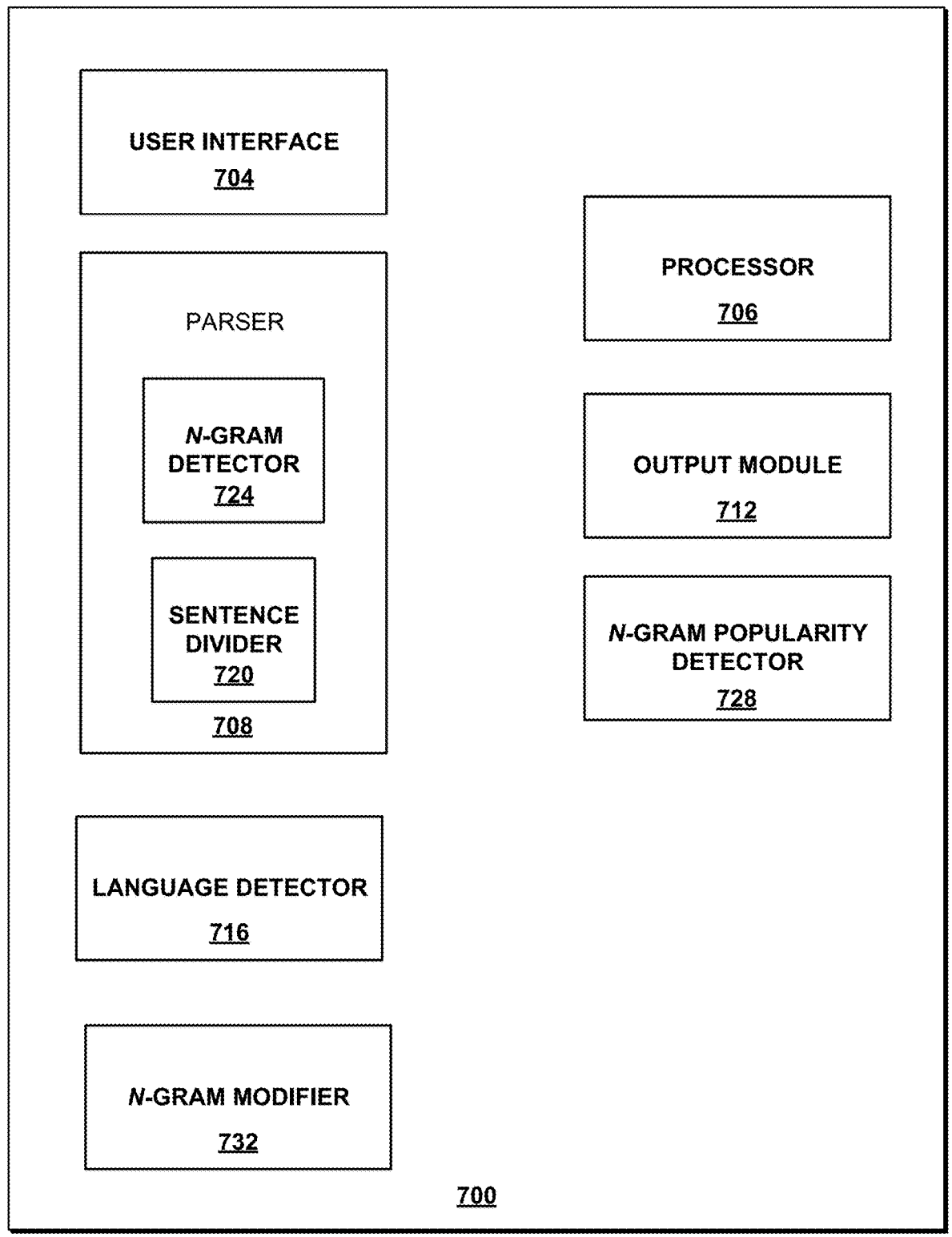
FIG. 7 is a block diagram of a device for computing a score for a title in accordance with one embodiment.

The processes described herein can be implemented via a computer based system performing the methods described herein. FIG. 7 illustrates an example of an apparatus for performing these processes in accordance with one embodiment. FIG. 7 shows a computer based device 700. A user interface 704 is shown that allows a title to be input. For example, the computer interface can include a display screen and a keyboard for managing input functions. A processor 706 is also shown in FIG. 7. The processor can perform the methods described herein.

A language detector 716 is shown. The language detector can be used in conjunction with the processor to determine in which language or languages a title is written. A parser 708 is also shown. The parser can work in conjunction with the processor to separate a title into subsets. For example, the parser can include a sentence divider 720 that works with the processor to divide a title into sentences. And, the parser can include an n-gram detector 724 that can work with the processor to identify n-grams in a series of words.

In order to determine which n-grams from a title are popular an n-gram popularity detector 728 can be used in conjunction with the processor. As noted above, some n-grams will not initially be determined to be popular. However, after modifying the unpopular n-grams, one can retest the modified n-grams to determine if the modified n-grams are popular. Thus, the n-gram modifier 732 can be used with the processor to modify n-grams. The modified n-grams can then be tested by the n-gram popularity detector 728.

When the results of the analysis of a title are determined, they can be output by the output module 712 in conjunction with the processor 706.

Figure 8:
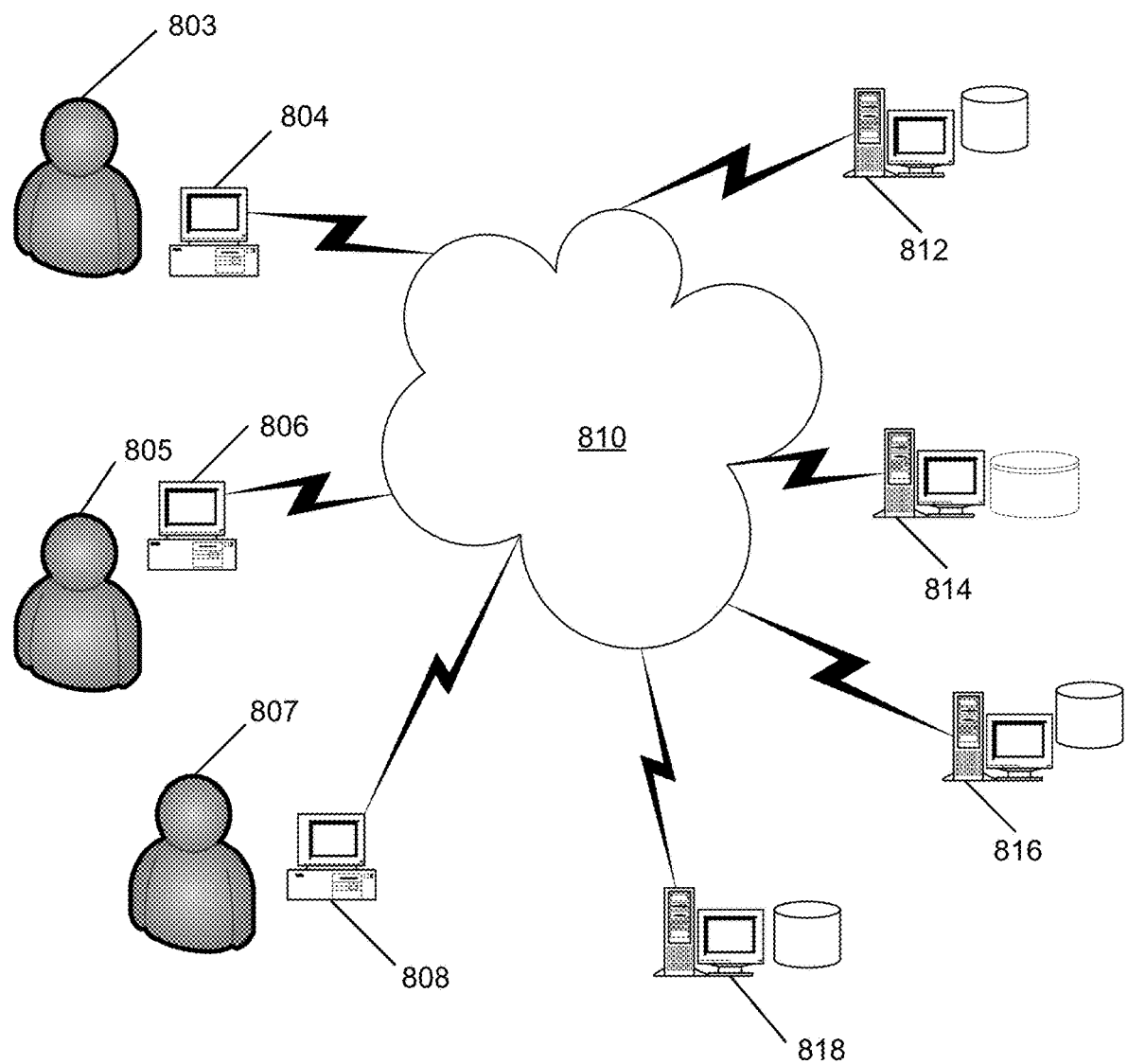
FIG. 8 is a block diagram of a network for implementing a title rating and improvement system in accordance with one embodiment.

FIG. 8 illustrates a block diagram of a system for implementing a title rating system and title improvement system in accordance with one embodiment. FIG. 8 shows users 803, 805, and 807 and their associated computers 804, 806, and 808. The users are communicatively coupled with a network 810, such as the Internet. In this example, the users are uploading video content to a server, such as a YouTube™ server 812. The server 812 allows other users to access uploaded video and to search for uploaded video based on titles assigned to respective videos.

FIG. 8 also shows a server 814. Server 814 can be a computer that is specially programmed to provide a tool that allows a user to access a rating for a particular title. Moreover, server 814 can be a computer that is specially programmed to provide a suggested improvement of a particular title. While in this example the title rating tool and title improvement tools are disposed at a separate computer (computer 814), the tools could alternatively be disposed on a user's own computer, such as computer 804, or on a video sharing computer, such as computer 812.

FIG. 8 also shows servers 816 and 818 as examples of sources of information that can be accessed across the network 810 to perform ratings of titles and suggested improvements to titles.

Figure 9:
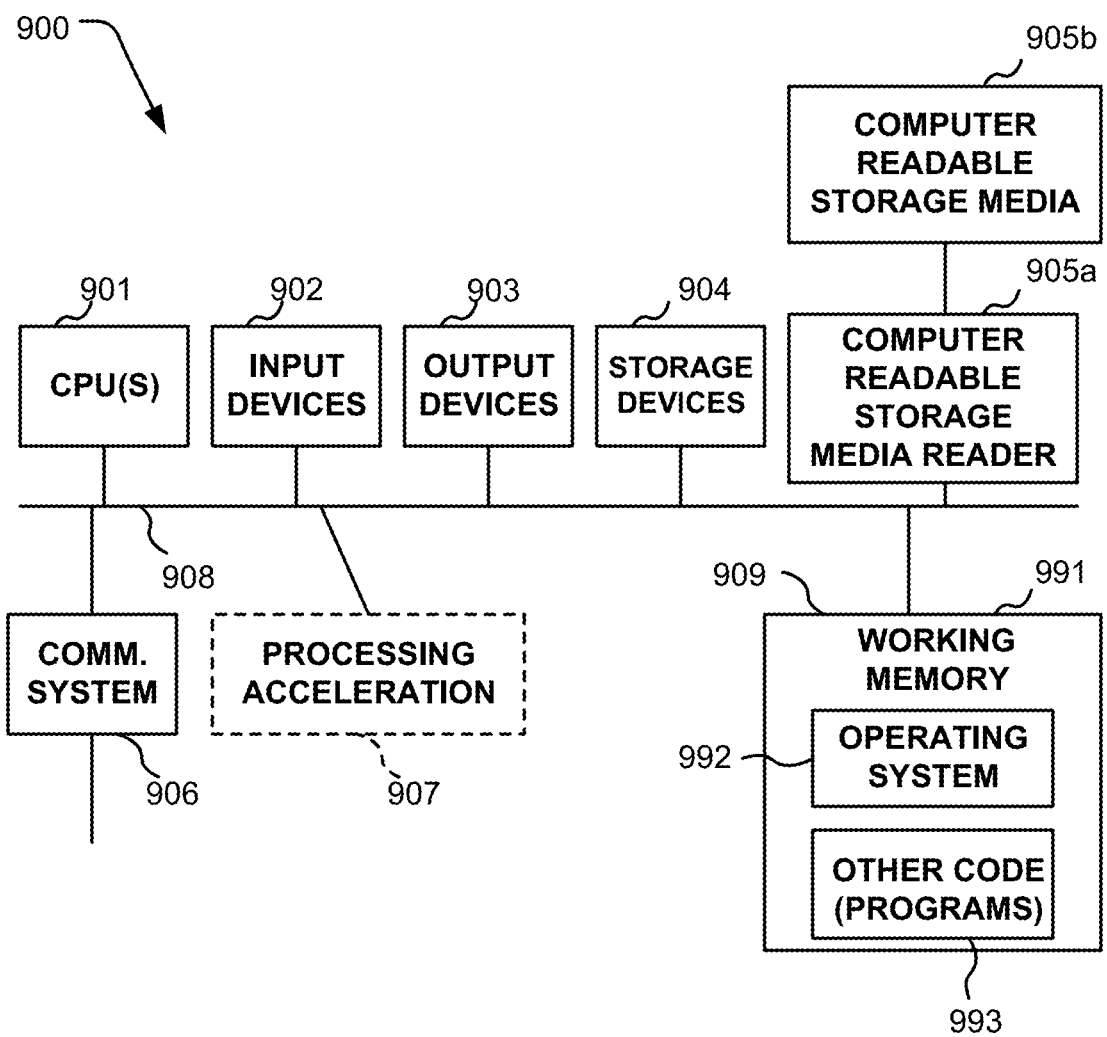
FIG. 9 is block diagram of a computing device in accordance with one embodiment.

FIG. 9 broadly illustrates how individual system elements can be implemented. System 900 is shown comprised of hardware elements that are electrically coupled via bus 908, including a processor 901, input device 902, output device 903, storage device 904, computer-readable storage media reader 905a, communications system 906 processing acceleration (e.g., DSP or special-purpose processors) 907 and memory 909. Computer-readable storage media reader 905a is further coupled to computer-readable storage media 905b, the combination comprehensively representing remote, local, fixed and/or removable storage devices plus storage media, memory, etc. for temporarily and/or more permanently containing computer-readable information, which can include storage device 904, memory 909 and/or any other such accessible system 900 resource. System 900 also comprises software elements (shown as being currently located within working memory 991) including an operating system 992 and other code 993, such as programs, applets, data and the like. As used herein, the term 'processor' includes any of one or more circuits, processors, controllers, filed-programmable gate arrays (FPGAs), microprocessors, application-specific integrated circuits (ASICs), other types of computational devices, or combinations thereof that are capable of performing functions ascribed to or associated with the processor.

System 900 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 900 component (e.g. within communications system 906). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) Not all system 900 components will necessarily be required in all cases.

For example, in an embodiment of the computer system, code for implementing the title-rating tool may be stored in the internal memory and configured to be operated by the processor.

In the above description, for the purposes of explanation, numerous specific details are set forth in order to provide a thorough understanding of the embodiments described. It will be apparent, however, to one skilled in the art that these embodiments may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential, as other embodiments may omit such features.

In the interest of clarity, not all of the routine functions of the embodiments described herein are shown and described. It will, of course, be appreciated that in the development of any such actual embodiment, numerous implementation-specific decisions must be made in order to achieve the developer's specific goals, such as compliance with application—and business-related constraints, and that those specific goals will vary from one embodiment to another and from one developer to another.

According to one embodiment, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows 8, Windows 7, Windows Vista™, Windows NT®, Windows XP PRO, and Windows® 2000, available from Microsoft Corporation of Redmond, Wash., Apple OS X-based systems, available from Apple Inc. of Cupertino, Calif., BlackBerry OS, available from Blackberry Inc. of Waterloo, Ontario, Android, available from Google Inc. of Mountain View, Calif. or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The above specification, examples, and data provide a complete description of the structure and use of exemplary embodiments. Since many embodiments can be made without departing from the spirit and scope of the technology, the claims recite the claimed embodiments. Furthermore, structural features of different embodiments may be combined in yet another embodiment without departing from the recited claims.

What is claimed is:

1. A method for evaluating a title in view of popular search topics to quantify searchability of the title, the method comprising:
   receiving as input a title of a video from a video sharing website;
   parsing the title of the video into one or more n-grams;
   obtaining a search volume for each of the one or more n-grams, the search volume indicating the popularity of a given n-gram;
   identifying popular n-grams in the one or more n-grams, the popular n-grams having a search volume above a predetermined threshold;
   computing, with a computer, a search engine optimization metric for the title based at least in part on the popular n-grams in the title;
   computing, with the computer, a title-searchability score based on the search engine optimization metric, the title-searchability score indicating a strength of the title when the content associated with the title is searched for;
   presenting information to a user indicating a probability of a search engine returning the title, the information based on the title-searchability score; and
   outputting one or more suggestions for making the title more searchable when the title-searchability score satisfies a condition.

2. The method of claim 1, wherein the one or more suggestions for making the title more searchable include a recommendation for improving the title-searchability score of the title by suggesting replacement words to include in the title.

3. The method of claim 2, wherein the replacement words are obtained from text-based sources.

4. The method of claim 2, wherein the replacement words are obtained from metadata associated with similar videos on the video sharing website.

5. The method of claim 1, wherein the
   search engine optimization metric is computing for the title using the total number of characters in the title and the number of popular n-grams in the title.

6. The method of claim 1, further comprising:
   identifying unpopular n-grams in the one or more n-grams, the unpopular n-grams having a search volume below a predetermined threshold.

7. The method of claim 6, further comprising:
   modifying the unpopular n-grams to remove one or more special characters.

8. The method of claim 1, wherein the information presented to the user indicating the probability of a search engine returning the title is a written assessment of the title based on the title-searchability score.

9. A system for evaluating a title in view of popular search topics to quantify searchability of the title, the system comprising:
   a user interface to receive as input a title of a video from a video sharing website;
   one or more processors configured to:
   parse the title of the video into one or more n-grams;
   obtain a search volume for each of the one or more n-grams, the search volume indicating the popularity of a given n-gram;
   identify popular n-grams in the one or more n-grams, the popular n-grams having a search volume above a predetermined threshold;
   compute a search engine optimization metric for the title based at least in part on the popular n-grams in the title;

compute a title-searchability score based on the search engine optimization metric, the title-searchability score indicating a strength of the title when the content associated with the title is searched for; and outputting one or more suggestions for making the title more searchable when the title-searchability score satisfies a condition; and a graphical user interface to present information to a user indicating a probability of a search engine returning the title, the information based on the title searchability score.

10. The system of claim 6, wherein the one or more suggestions for making the title more searchable include a recommendation for improving the title-searchability score of the title by suggesting replacement words to include in the title.

11. The system of claim 9, wherein the
search engine optimization metric for the title is computed using the total number of characters in the title and the number of popular n-grams in the title.

12. The system of claim 9, wherein the processor is further configured to:

identify unpopular n-grams in the one or more n-grams, the unpopular n-grams having a search volume below a predetermined threshold; and modify the unpopular n-grams to remove one or more special characters.

13. One or more tangible processor-readable storage media of a tangible article of manufacture encoding processor-executable instructions for executing on an electronic computing system a process for evaluating a title in view of popular search topics to quantify searchability of the title, the process comprising:

receiving as input a title of a video from a video sharing website;

parsing the title of the video into one or more n-grams;

obtaining a search volume for each of the one or more n-grams, the search volume indicating the popularity of a given n-gram;

identifying popular n-grams in the one or more n-grams, the popular n-grams having a search volume above a predetermined threshold;

computing, with a computer, a search engine optimization metric for the title based at least in part on the popular n-grams in the title;

computing, with the computer, a title-searchability score based on the search engine optimization metric, the title-searchability score indicating a strength of the title when the content associated with the title is searched for;

presenting information to a user indicating a probability of a search engine returning the title, the information based on the title-searchability score; and outputting one or more suggestions for making the title more searchable when the title-searchability score satisfies a condition.

14. The one or more tangible processor-readable storage media of claim 13, wherein outputting operation further comprises:

generating a recommendation for improving the title-searchability score of the title by suggesting replacement words to include in the title.

15. The one or more tangible processor-readable storage media of claim 13, wherein the search engine optimization metric for the title is computed using the total number of characters in the title and the number of popular n-grams in the title.

\* \* \* \* \*